Dec. 27, 1938.   N. NIELSEN   2,141,660
VEHICLE PULSATOR
Filed April 14, 1936   3 Sheets-Sheet 1

INVENTOR.
Nicholas Nielsen
BY
ATTORNEY.

Dec. 27, 1938.　　　　　N. NIELSEN　　　　　2,141,660
VEHICLE PULSATOR
Filed April 14, 1936　　　　3 Sheets-Sheet 2
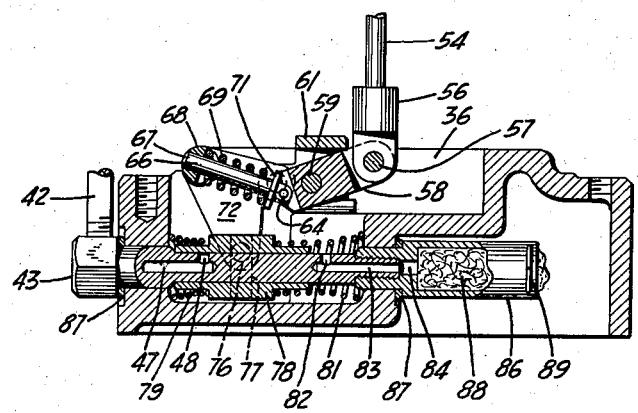
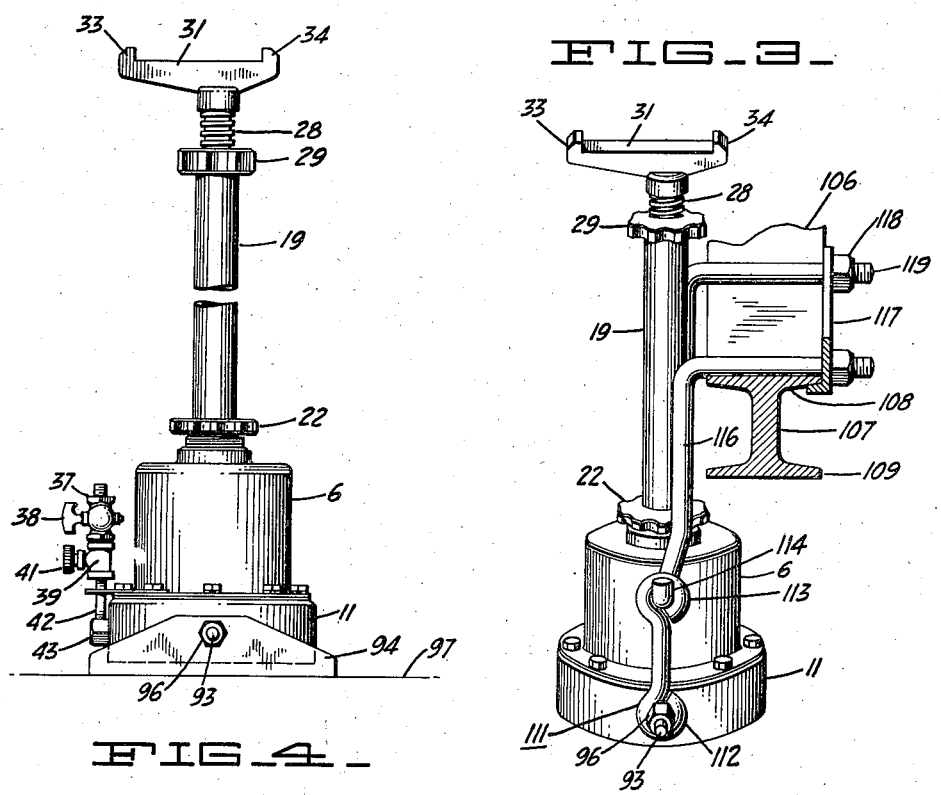
INVENTOR.
Nicholas Nielsen
BY
ATTORNEY.

Dec. 27, 1938. N. NIELSEN 2,141,660
VEHICLE PULSATOR
Filed April 14, 1936 3 Sheets-Sheet 3
FIG_5_
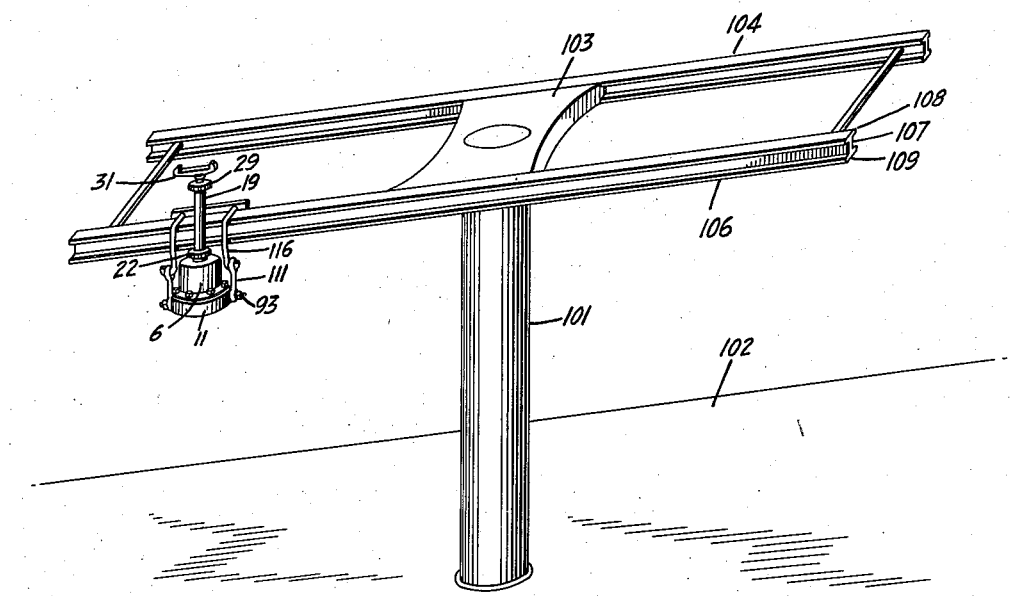
INVENTOR.
Nicholas Nielsen
BY
ATTORNEY.

Patented Dec. 27, 1938

2,141,660

UNITED STATES PATENT OFFICE 2,141,660

VEHICLE PULSATOR

Nicholas Nielsen, Oakland, Calif.

Application April 14, 1936, Serial No. 74,267

2 Claims. (Cl. 121—164)

The present invention relates to means for introducing a relative movement between a vehicle, such as an automobile, and its support, such movement being directly under the control of an operator and generally consisting of a periodic oscillation which is particularly useful in connection with the lubrication of the vehicle and in servicing the car for squeaks and rattles.

It is customary to lubricate a vehicle, such as an automobile, by driving the vehicle into position over a lift or comparable elevating mechanism which, when operated, engages either the vehicle chassis or wheels and lifts the vehicle several feet into the air. The lift ordinarily comprises a pair of parallel channel irons mounted on a central supporting post which forms the plunger of a hydraulic elevator.

It is an object of the invention to provide a motion producing means or pulsator which is particularly useful in conjunction with a vehicle lift.

Another object of the invention is to provide a pulsator which can be utilized in connection with a lift without imposing any extraordinary strains thereon.

A further object of the invention is to provide an improved arrangement for interrupting the operation of such a pulsator.

An additional object of the invention is in general to provide an improved and more advantageous pulsator mechanism.

The foregoing and other objects are attained in the embodiment of the invention illustrated in the drawings, in which:

Figure 2 is a detail showing in cross section, on the same plane as Figure 1, of the valving mechanism in one extreme position.

Figure 3 is a perspective view of a pulsator mechanism mounted on one rail of a vehicle lift.

Figure 4 is a side elevational view of a modified form of pulsator according to the invention.

Figure 5 is a perspective view of an automobile lift with a pulsator of the invention attached thereto.

Figure 1:
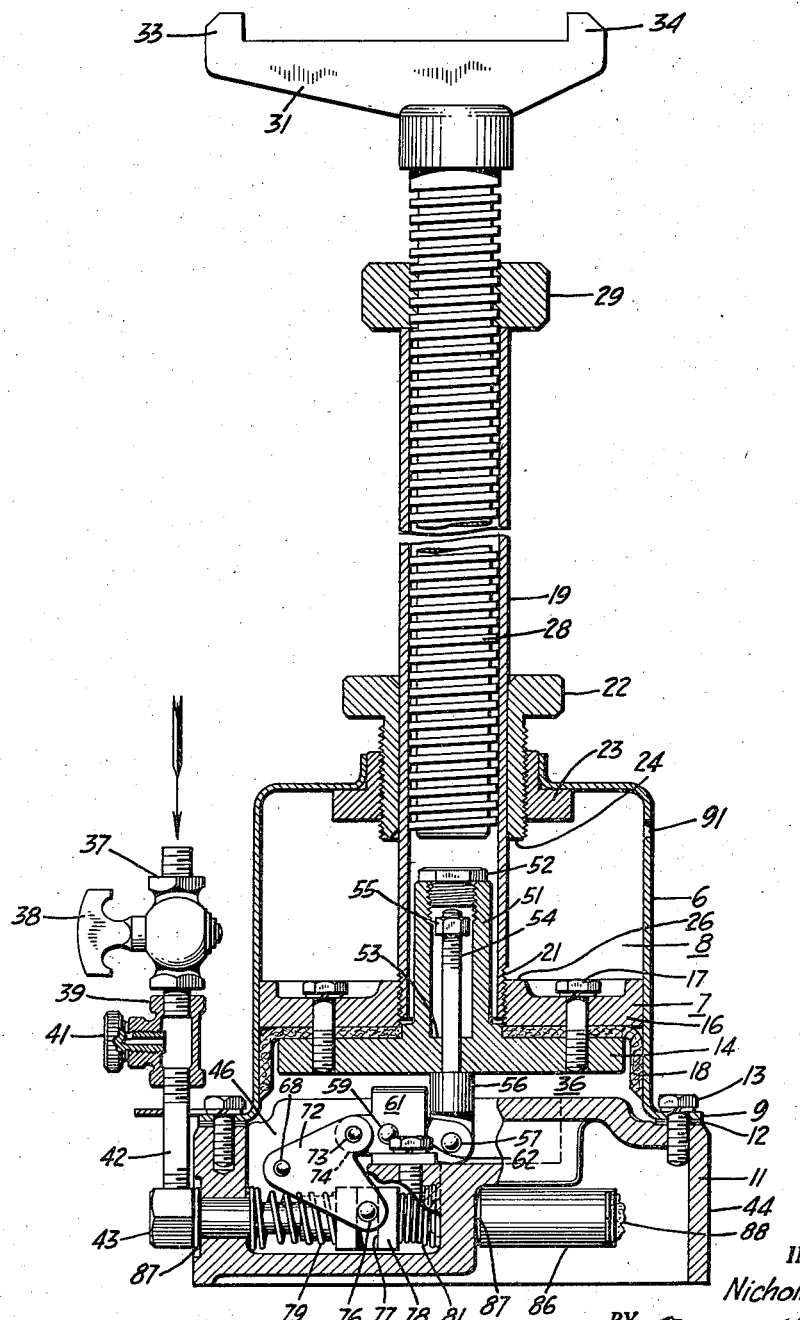
Figure 1 is a cross sectional view, on a longitudinal, axial plane, of a pulsator constructed in accordance with the invention.

In its preferred form, the pulsator of the present invention includes an expansible chamber provided with means for attaching the chamber to a vehicle lift, and likewise provided with means for engagement with a vehicle, together with a valving arrangement for controlling pressure fluid flow into and out of the expansible chamber in order to afford a pulsating movement thereof and regulated by means for limiting the relative expansion of the chamber at a selected point.

The pulsator, as shown in the drawings, includes an expansible chamber comprising a body 6 forming a cylinder, and a piston 7, which together define a chamber 8. The member 6 is circular-cylindrical in cross sectional contour and preferably is fabricated of heavy sheet metal. It is provided with a peripheral flange 9 disposed adjacent the upper face of a cap 11 with a gasket 12 interposed, and is held in position by a plurality of cap screws 13. The piston itself is fabricated of a lower disc 14 to which an upper disc 16 is fastened by cap screws 17 with a cup leather 18 clamped therebetween. This piston is reciprocable within the cylinder 6 and is guided by a piston rod 19 which passes through an aperture in the cylinder 6 and preferably is formed of hollow or tubular stock having threads 21 at the lower end to engage the upper disc 16.

The piston rod 19 is supported by a threaded bushing 22 which adjustably engages a threaded and flanged boss 23 fastened to the cylinder 6 by any suitable means, for instance, by welding. This bushing 22 at its upper part is enlarged to form an undulated flange affording a good hand grip so that the bushing 22 can be rotated with respect to the cylinder 6 and can thus be projected more or less into the chamber 8. By selectively positioning the bushing 22, the lower face 24 thereof may be utilized as an abutment for the hub face 26 of the upper disc 16 to stop the upward travel of the piston and the piston rod at any adjusted or selected point.

In order that the effective length of the piston rod can be varied, there is provided a screw 28 within the piston rod 19, and a nut 29 to engage the screw and to abut the upper end of the piston rod, so that when the nut is appropriately rotated the relative vertical adjustment of the screw 28 and the piston rod 19 may be varied. A saddle 31 is mounted on the upper end of the screw 28 and is adapted to engage the chasis of a vehicle. In order to preclude undue transverse movement of the saddle with respect to the vehicle, and in order to provide a relatively secure engagement therewith, the saddle terminates in a pair of lugs 33 and 34 which extend beyond the surface of the saddle to form abutments.

A chamber 36 between the piston and the head 11 is expansible complementarily with the chamber 8 and, in accordance with the invention, I preferably cause pressure fluid to flow into and out of the chamber 36 in order to provide relative expanding and contracting movement between the saddle 31 and the cap 11. Suitable fluid pressure for this purpose is derived from a source, not shown, and enters the mechanism through a plug cock 37 having a handle 38 to turn the flow off or on. In series with the plug cock is a bleeder valve 39 provided with a thumbscrew 41 so that fluid may be released from the chamber 36 to permit descent of the piston after its upward movement has been arrested by abutment 24. From the valve 37 fluid flow continues through a nipple 42 into a fitting 43 which pierces the peripheral flange 44 of the cap 11. The fitting 43 extends into a sump-like extension 46 of the chamber 36 and is provided with an axial bore 47 terminating short of the center of the fitting as shown in Figure 2 and being intersected by a cross-bore 48. As shown also in Figure 1, the cross-bore opens into the chamber 36, so that when the valve 78 is open, fluid under pressure flows through the passages 47 and 48 into the chamber 36 and causes the piston 7 to rise in the cylindrical body 6 and to lift the saddle 31, raising a vehicle or comparable structure engaged by the saddle 31.

In order to regulate the upward movement as desired, and in order to introduce a pulsating reciprocation, a valve mechanism for controlling the flow of pressure fluid entering and leaving the chamber 36 is provided. This mechanism preferably utilizes the piston itself as a controlling part, and consequently there is provided an extended hollow hub 51 on the lower disc 14, which extends telescopically within the piston rod 19. The hub 51 is closed at its upper end by a cap plug 52 to provide a chamber having a lower abutting surface 53. Guided within the hub 51 is a link 54 carrying at its upper end an adjusting nut 55 and at its lower end passing loosely through the lower disc 14 and terminating in an enlargement 56 adapted in one position to abut the under surface of the disc 14.

The enlargement 56 carries a cross pin 57 pivotally connecting the link 54 to a lever 58 (see Figure 2) forming one member of a toggle. The lever 58 is pivotally mounted on a through pin 59 carried in the opposite sides of a stirrup 61 fastened by cap screws 62 to the cap 11. Pinned to the lever 58 by a pin 64 is a rod 66 passing through an aperture 67 in an enlarged pivot rod 68. A compression coil spring 69 is interposed between a flat face on the pivot rod 68 and a washer 71 encompassing the pin 66 and bearing against one of two angular faces on the rocking lever 58. The pivot rod 68 is pivotally mounted between a pair of identical toggle plates 72, each of which is pivoted by a short pin 73 to ears 74 projecting on opposite sides of the center of the stirrup 61. The coincidental axis of the short pins 73 is related to the axis of the pin 64 and to the pivotal axes of the pivot rod 59 and pivot pins so that a snap-acting toggle mechanism is provided which is impelled by the spring 69 into either of its two extreme positions on opposite sides of the pivotal axis of the short pins 73.

The plates 72 are provided with inwardly projecting lugs 76 which ride in grooves 77 in a valve sleeve 78 mounted to slide on the fitting 43. The central part of the valve sleeve is enlarged, while the end portions are each reduced in diameter to provide seats and guides for centralizing coil springs 79 and 81 which abut against the valve sleeve 78 and against the cap 11. When the piston 17 is in its lowermost position, as shown in Figure 1, the lower disc 14 abuts the enlargement 56, forcing the pin 57 to its lowermost position, thus rocking the member 58 and lifting the pin 64. This first compresses the coil spring 69 until the rod 68, and the pins 64, 73, and 59 are all slightly past their position of alignment, whereupon the coil spring 69 expands and the pins 76 drive the valve sleeve 78 to the right, as seen in Figure 1, compressing the spring 81 with the assistance of the spring 79. The valve sleeve thereupon completely uncovers the passage 48, and free influx of pressure fluid to the chamber 36 is permitted.

When the piston rises sufficiently so that the abutting surface 53 contacts the adjusting nut 55, the nut is lifted along with the piston and the link 54 follows such movement, thereby lifting the pin 57. The reverse of the above described operation of the toggle linkage is thereupon effected, and the spring 69 as it passes aligned center position, moves the valve sleeve 78 quickly to the left, as seen in Figure 2, compressing the spring 79 with the assistance of the spring 81, so that the aperture or passage 48 is covered, cutting off the influx of pressure fluid.

This movement of the valve sleeve simultaneously uncovers a passage 82 leading to a duct 83 in the valve fitting 43 and which is aligned with a central bore 84 in a casing 86. The casing 86 passes through an aperture in the wall of the cap 11 and screws upon the fitting 43 so that the fitting and the casing are drawn into place against gaskets 87 to preclude the leakage of pressure fluid. The passage 84 enlarges within the member 86 so that the pressure fluid discharges to the atmosphere through a muffling material 88, such as fiber, glass wool or felt, retained in place by a cotter pin 89.

When the pressure within the chamber 36 has been reduced sufficiently by the efflux of pressure fluid through the passage 82 to the atmosphere, the weight imposed upon the saddle 31 drives the piston 7 downwardly in the cylinder 6, continuing the discharge of air, until such time as the lower surface of the piston contacts the enlargement 56 and reverses the toggle mechanism of the valve, and the above described cycle is automatically repeated.

The alternate operation of the valving mechanism and the alternate up-and-down movement of the saddle 31 can be termed "pulsations" and can be regulated in extent, very largely, by the relative position of the nut 55 on the stem 54, so that the stem is raised at an earlier or later stage of the lifting movement of the piston. The speed of admission of pressure fluid can be suitably adjusted by turning the valve 38, while the lowering movement can be regulated not only by an appropriate size of the efflux passage 82 but by the dashpot effect of air flowing into and out of the chamber 8 through a breathing hole 91 which can be made any desired size.

In the event the pulsating movement is not desired and the vehicle is to be held elevated in position for an indeterminate length of time, the bushing 22 can be appropriately rotated so that the lower abutting face 24 thereof is projected into the chamber 8 so that the surface 26 of the upper disc 16 will abut the projected bushing prior to the time that the abutting surface 53 contacts the adjusting nut 55 to reverse the valve mechanism. With this arrangement the influx passage 48 is not closed and pressure fluid continues to exert its effect within the chamber 36 and to maintain the saddle in elevated condition until such time as the bushing 22 is withdrawn from the chamber 8, when the piston may complete its upward movement, thereby reversing the valving mechanism and the pressure fluid discharge from the chamber 36. The load may also be lowered without restarting reciprocatory action, by closing valve 37 and opening bleeder valve 39, permitting the fluid to be exhausted therethrough.

The pulsator can be utilized in connection with a vehicle by simply positioning the pulsator on the floor or ground or any suitable support, and having the saddle 31 rest against an appropriate part of the vehicle. When this procedure is followed, the vehicle is raised usually by one corner or by one side, and the lifted part of the vehicle necessarily rises somewhat in an arcuate path. It is preferable to arrange matters so that this arcuate movement is compensated for without undue strains on the pulsator itself and without causing binding between the piston rod 19 and the bushing 22. Preferably the cap 11 is provided with a pair of oppositely extending studs 93 which are axially aligned to lie along an axis at right angles to the saddle 31. Engageable with studs 93 are plates 94 rockably secured to cap 11 by nuts 96. The lower edges of the plates 94 contact the floor or other support 97, while the upper saddle 31 can move in an arc in a plane perpendicular to the axis of the extensions 93, permitting an inclination of the major portion of the pulsator to the right or left, as seen in Figure 4, without introducing any deleterious strains whatsoever.

In most instances, the pulsator is utilized in connection with a vehicle lift of the type disclosed in Figure 5. The lift mechanism comprises a central plunger 101 which preferably is hydraulically actuated from below the floor 102 by a cylinder and hydraulic connections, not shown. The plunger 101 at its upper end terminates in a spider 103 to which is attached a pair of parallel rails 104 and 106. Each rail includes a central web 107, an upper flange 108 and a lower flange 109. In the use of the device the plunger 101 is lowered as much as possible, the vehicle is driven into position over the rails 104 and 106, pressure fluid is admitted below the plunger 101, and the rails 104 and 106 contact the vehicle chassis at four points adjacent the ends of the rails and lift the vehicle any convenient distance into the air in order to permit access to the under side thereof.

In accordance with the invention, and to preclude any major departure of the distribution of strains on the lift mechanism from that contemplated by its design, it is desirable to provide the pulsator unit with a support of the type shown in Figure 3 in which the extensions 93 which project along an axis at right angles to the saddle 31 are each engaged by a link 111. An eye 112 on the link directly engages its associated projection 93 and a comparable eye 113 is located substantially at the center of gravity of the pulsator assembly. Engaging each eye 113 is the hooked end 114 of one of a pair of supporting tension members 116 extending upwardly and passing over a top rail flange 108. The two tension members 116 pass through an angle iron 117 forming a hook overlying and engaging with the flange 108 and held in appropriate location by nuts 118 fastened on the threaded ends 119 of the tension members.

With this mounting, the saddle 31 engages the chassis of the vehicle at a point which is transversely displaced with respect to the center of the rail 106, for instance, while the tension members 116 form pivots for the eyes 113 or, alternatively, the members 116 and the links 111 together form tension supports and the eyes 112 then form pivots for the extensions 93, so that the saddle 31 can move transversely with respect to the side rails 104 and 106. When the saddle 31 is in extended position and moves through an arc the plane of which is transverse to the rails 104 and 106, there are no deleterious bends or side strains imposed upon the pulsator. The hook engagement provided by the members 116 and the angle 117 preferably is somewhat loose so that the pulsator may also rock in a plane parallel to the longitudinal axis of the rail to which it is attached, and can, if desired, also be withdrawn from position over the end of the rail 106.

I claim:

1. A pulsator comprising a pair of relatively movable members forming an expansible chamber, a toggle valve controlling influx and efflux of fluid from said chamber, means responsive to expansion and contraction of said chamber for operating said valve to effect pulsation, and means for insuring that said pulsation will be arrested with said chamber at substantially maximum expansion comprising a member adjustable to restrain operation of said valve in one direction only.

2. A pulsator comprising a base, a cylinder mounted thereon and provided with an apertured cylinder head, a piston reciprocable within said cylinder, a piston rod mounted on said piston and extending through said apertured cylinder head to provide load engaging means movable by said piston to raise a load away from said base, a toggle valve in said base for controlling fluid movement into and out of said cylinder, an operating connection between said piston and said valve, and adjustable means on said cylinder head encompassing said piston rod for arresting movement of said piston and preventing operation of said valve thereby when said load engaging member is adjacent its uppermost position, said valve being freely operable by said piston whenever said load engaging member is adjacent the lowermost position thereof.

NICHOLAS NIELSEN.